United States Patent [19]
Hammond

[11] 3,887,222
[45] June 3, 1975

[54] COUPLING WITH PUSH-PULL RELEASE

[75] Inventor: Harry H. Hammond, Middleburg, Ohio

[73] Assignee: The Hansen Manufacturing Company, Cleveland, Ohio

[22] Filed: July 25, 1974

[21] Appl. No.: 491,790

[52] U.S. Cl. .................. 285/307; 24/211 R; 85/8.8; 285/321; 285/DIG. 22; 403/326
[51] Int. Cl. .............................................. F16l 37/00
[58] Field of Search...285/307, 321, 276, 6, DIG. 25, 285/DIG. 22; 403/326; 287/DIG. 7; 85/8.8; 24/211 R

[56] References Cited
UNITED STATES PATENTS

| | | | |
|---|---|---|---|
| 3,434,745 | 3/1969 | Jackman | 285/321 X |
| 3,439,944 | 4/1969 | Leutenegger | 285/321 |
| 3,540,760 | 11/1970 | Miller et al. | 285/321 |

Primary Examiner—Richard J. Scanlan, Jr.
Assistant Examiner—Moshe I. Cohen

[57] ABSTRACT

An improved coupling assembly includes a plug on which a resiliently compressible lock ring is disposed. As the plug is inserted into a socket, a stop ring in a socket chamber deflects the lock ring radially inwardly from an expanded condition to a contracted condition to enable the lock ring to pass through a circular central opening in the stop ring. Once the lock ring has moved axially inwardly of the stop ring, the natural resilience of the lock ring causes it to expand radially outwardly to hold the plug in the socket chamber. When the coupling is to be disconnected, the plug is pushed further inwardly and the lock ring is radially compressed by a movable cam ring slightly smaller than the stop ring. The cam ring compresses the lock ring to the contracted condition. The lock ring and the cam ring are then free to move backwards and the cam ring can pass through the opening in the stop ring as the plug is pulled outwardly.

6 Claims, 5 Drawing Figures 3,887,222

COUPLING WITH PUSH-PULL RELEASE

BACKGROUND OF THE INVENTION

The present invention relates to a new and improved coupling assembly and more particularly to a coupling assembly having a plug which is held in a socket chamber by engagement of a lock ring on the plug with a stop ring in the socket chamber.

Many known coupling assemblies include a plug which is held in a socket chamber by a plurality of locking balls. The locking balls are held in engagement with an annular groove in the plug by an axially movable socket sleeve. Although couplings of this known construction have been very satisfactory in many different environments, these couplings include a substantial number of parts which must be accurately manufactured and carefully assembled. Of course, this tends to increase the cost of making these known couplings.

SUMMARY OF THE PRESENT INVENTION

The present invention provides an improved coupling which has relatively few parts and is easily assembled and reliable in operation. The coupling includes a socket having a chamber into which an outer end portion of a plug is inserted. As the plug is inserted into the chamber, a lock ring is resiliently compressed radially inwardly to a contracted condition by a stop ring disposed in the socket chamber. As the lock moves axially inwardly past the stop ring, it resiliently expands outwardly to a diameter which is greater than the diameter of the opening in the stop ring. Thereafter, the lock ring abuttingly engages the stop ring to prevent pulling of the plug out of the socket chamber.

When the coupling is to be disconnected, the plug is moved axially inwardly. During this axially inward movement, a cam ring in the socket chamber compresses the lock ring to a diameter which is less than the diameter of the opening in the stop ring. Upon subsequent outward movement of the plug, the cam ring and lock ring are moved outwardly until the lock ring extends at least part way through the opening in the stop ring. Continued outward movement of the plug results in disengagement of the cam ring from the lock ring. When the lock ring has been moved outwardly past the stop ring, the natural resilience of the lock ring causes it to again expand outwardly.

Accordingly, it is an object of this invention to provide a new and improved coupling assembly in which a plug and socket are held in engagement with each other by a lock ring and wherein the lock ring can be compressed by a cam ring which is slidably disposed in the socket to enable the compressed lock ring to move through an opening in a stop ring as the plug is withdrawn from the socket chamber.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
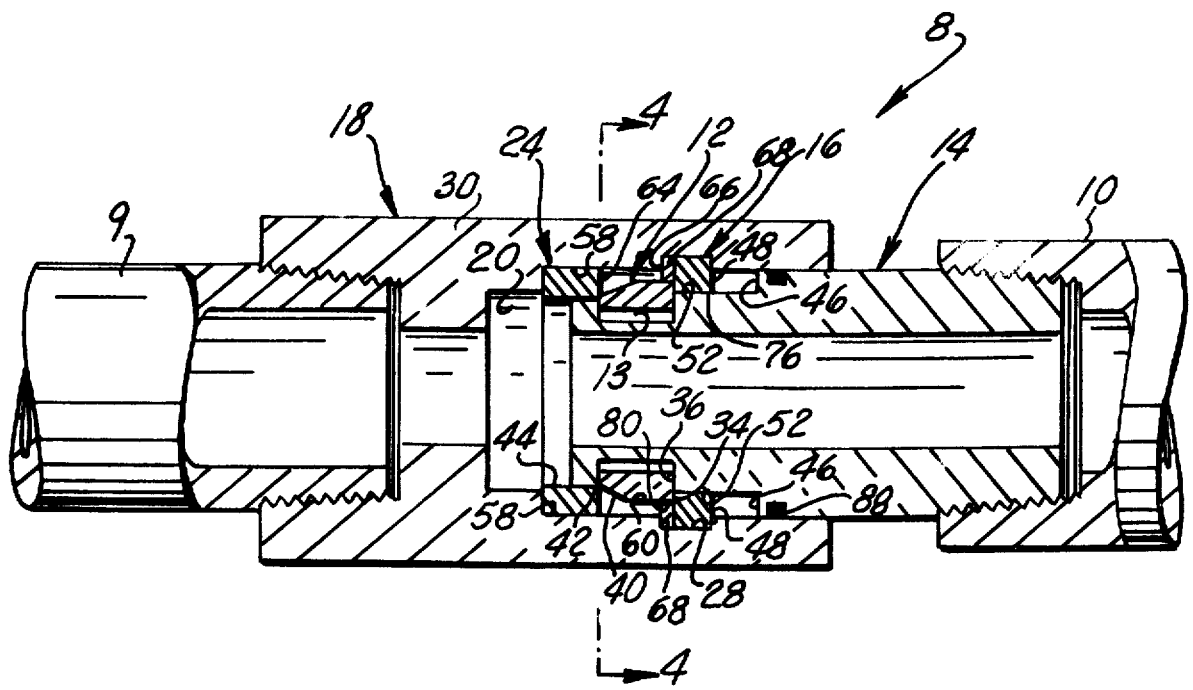
FIG. 1 is a sectional view of a connected coupling assembly constructed in accordance with the present invention and illustrating the relationship between a lock ring disposed on the plug and a stop ring disposed in a socket chamber.

A coupling assembly 8 constructed in accordance with the present invention is illustrated in FIG. 1 in an engaged condition connecting a pair of conduits 9 and 10 in fluid communication. An annular lock ring 12 is disposed in an annular groove 13 in a plug 14. The lock ring 12 engages an annular stop ring 16 fixedly mounted on a socket 18 to hold the plug in a socket chamber 20.

When the coupling 8 is to be disengaged, the plug 14 is pushed further into the chamber 20. As the plug 14 moves axially into the chamber 20, the lock ring 12 moves into a telescopic relationship with an annular cam ring 24 and is compressed radially inwardly by the cam ring in the manner illustrated in FIG. 2. Upon subsequent outward movement of the plug 14 from the position shown in FIG. 2 to the position shown in FIG. 3, the cam ring 24 and lock ring 12 are moved outwardly toward the stop ring 6. The lock ring 12, which has been compressed by the cam ring 24, moves through a circular central opening in the stop ring 16. Continued outward movement of the plug 14 results in the cam ring 24 being pushed axially off of the lock ring 12. Still further outward movement of the plug 14 moves the lock ring 12 clear of the stop ring 16.

When the coupling assembly 8 is in the engaged condition of FIG. 1, the interaction between the lock ring 12 disposed on the plug 14 and stop ring 16 on the socket 18 prevents the plug 14 from being withdrawn from the socket chamber 20. Thus, the stop ring 16 is disposed in an annular groove 28 formed in the socket wall 30. The stop ring 16 has an annular axially inner surface 34 which is abuttingly engaged by an annular axially outer surface 36 on the lock ring 12. The abutting engagement of the surfaces 34 and 36 prevents the plug 14 from being pulled out of the socket chamber 20.

To disconnect the coupling 10, it is necessary to radially compress the lock ring 12 so that it has an exterior diameter which is less than the interior diameter of the stop ring 16. This is accomplished by pushing the plug 14 axially inwardly. As the plug 14 moves axially inwardly, a frustroconical surface 40 on the lock ring 12 is engaged by a circular corner portion 42 of the cam ring 24. During continued axially inward movement of the plug 14, the circular corner portion 42 of the cam ring 24 resiliently compresses the lock ring 12 from the expanded condition of FIG. 1 to the contracted condition of FIG. 2. As this is occurring, the lock ring 12 moves through an opening formed by a cylindrical inner surface 44 of the cam ring 24 into a telescopic relationship with the cam ring. Continued inward movement of the plug 14 moves an annular surface 46 on the plug 14 into abutting engagement with an annular axially outer surface 48 on the stop ring 16 to limit the axially inward movement of the plug 14.

Figure 2:
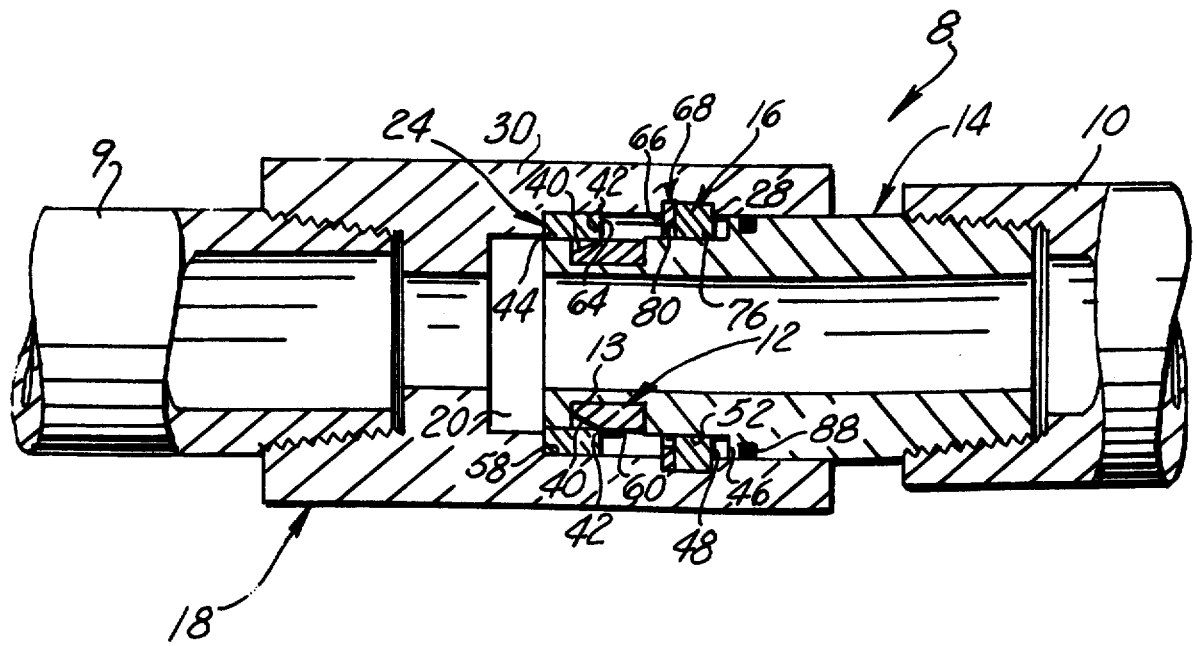
FIG. 2 is a sectional view illustrating how the lock ring is compressed by cam ring as the plug is moved axially inwardly from the position shown in FIG. 1.

When the lock ring 12 has been resiliently compressed to the contracted condition of FIG. 2, the lock ring has a maximum external diameter which is less than the diameter of a circular opening 52 in the stop ring 16. Therefore, the radially compressed lock ring 12 and cam ring 24 can be moved axially outwardly together from the position shown in FIG. 2 to the position shown in FIG. 3. As the plug 14 is being moved outwardly, a cylindrical radially outer surface 58 on the cam ring 24 slides along a cylindrical inner surface of the socket wall 30 to guide the movement of the plug 14.

Figure 3:
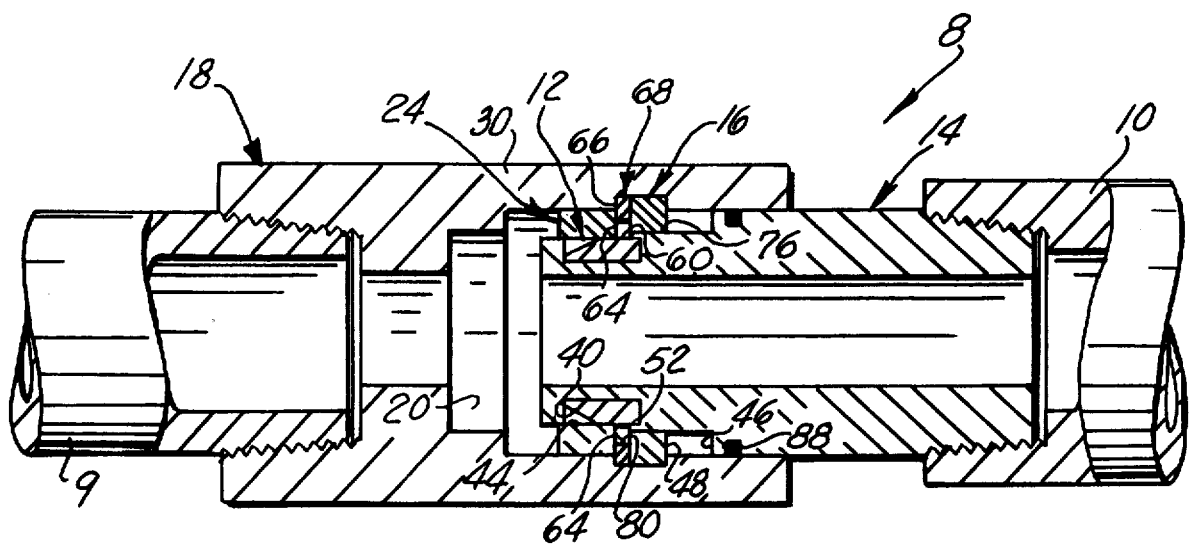
FIG. 3 is a sectional view, generally similar to FIGS. 1 and 2, illustrating movement of the compressed lock ring through a central opening in the stop ring.
Figure 4:
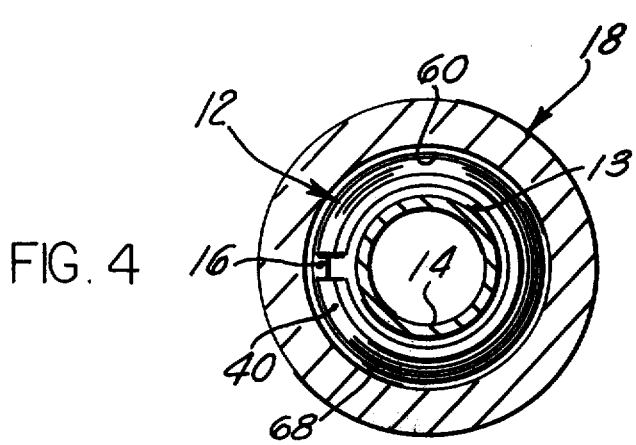
FIG. 4 is a sectional view, taken generally along the line 4—4 of FIG. 1, further illustrating the relationship between the plug, lock ring and socket when the coupling is in the connected condition.

As the plug 14, lock ring 12 and cam ring 24 are simultaneously moved axially outwardly, the inner surface 44 of the cam ring applies radially inwardly directed force against a cylindrical outer surface 60 of the lock ring 12 to hold the lock ring in the compressed condition. The cam ring 24 and lock ring 12 remain in a telescopic relationship as an annular outer surface 64 on the cam ring 24 moves into abutting engagement with an annular stop surface 66 formed on a retainer ring 68 (FIG. 3). It should be noted that when the lock ring 12 engages the retainer ring 68, the cylindrical outer surface 60 on the lock ring has moved into a telescopic relationship with the cylindrical inner surface 52 on the stop ring 16.

Continued outward movement of the plug 14 results in disengagement of the lock ring 12 from the cam ring 24 and movement of the lock ring through the circular opening in the stop ring 16. Thus, as the plug 14 is pulled outwardly from the position shown in FIG. 3, a sliding action occurs between the surface 60 of the lock ring 12 and the surface 44 on the cam ring 24. Once the lock ring 12 has moved out of engagement with the cam ring 24, the lock ring expands slightly so that the cylindrical surface 60 in the lock ring moves outwardly into abutting engagement with the cylindrical inner surface 52 of the stop ring 16.

Still further outwrad movement of the plug 14 results in sliding on the surface 60 along the surface 52 as the lock ring 12 is pulled through the stop ring 16. As the lock ring 12 is withdrawn from the stop ring 16, the lock ring expands radially outwardly and the frustroconical surface 40 on the lock ring slides on an axially outer corner portion of the stop ring. Of course, once the lock ring 12 has been moved axially outwardly of the stop ring 16, the plug 14 can be readily withdrawn from the socket 18. It should be noted that the sides of the groove 13 hold the expanded lock ring on the leading end of the plug 14.

When the coupling 8 is to be reconnected, the leading end portion of the plug 12 is inserted into the axially outer end portion of the socket chamber 20. As the plug 14 is moved further inwardly, the frustroconical surface 40 on the lock ring 12 moves into abutting engagement with the circular outer corner portion 76 of the stop ring 16. Continued inward movement of the plug 14 results in the lock ring 12 being radially compressed from the expanded or free condition by the circular corner portion 76 of the stop ring 16. Once the lock ring 12 has been compressed to the retracted condition, the cylindrical outer surface 60 on the lock ring 12 slides along the cylindrical inner surface 52 on the stop ring 16 as the plug 14 is pushed into the socket chamber 20.

When the plug 14 has been moved inwardly to the position shown in FIG. 1, the lock ring 12 resiliently expands radially outwardly until the cylindrical surface 60 engages a cylindrical inner surface 80 on the retaining ring 68. The cylindrical surface 80 prevents the lock ring 12 from expanding outwardly to a diameter at which the frustroconical leading end surface 40 has a minor diameter which is greater than the inside diameter of the cam ring 24. Once the lock ring 12 has expanded outwardly to the condition shown in FIG. 1, the plug 14 is held in the chamber 20 by abutting engagement between the annular surface 36 on the lock ring 12 and the surface 34 on the stop ring 16. Although the retaining ring 68 and the stop ring 16 have been illustrated as two separate elements, it should be understood that the retaining ring 68 could be integrally formed with the stop ring 16.

Figure 5:
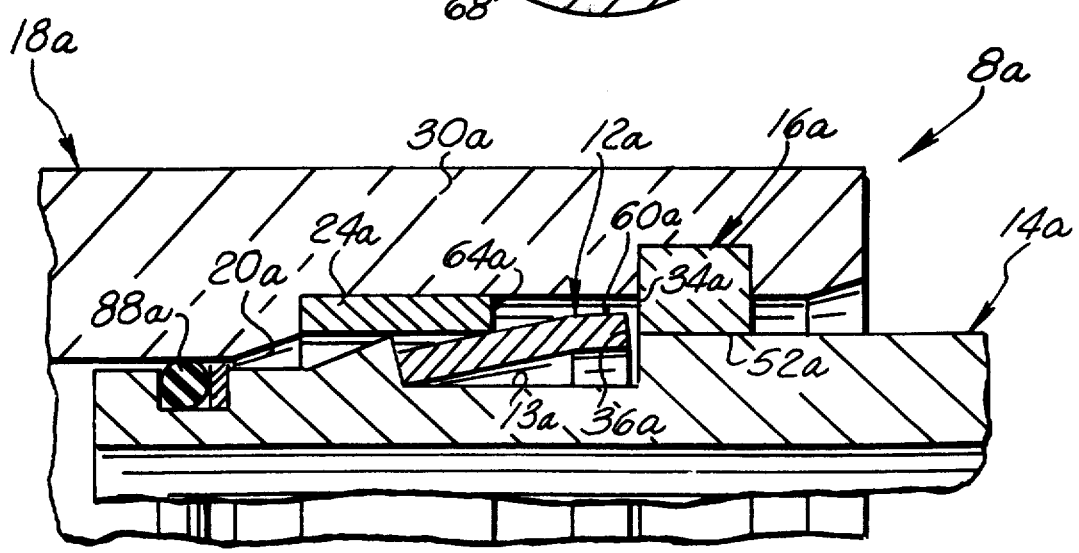
FIG. 5 is an enlarged fragmentary sectional view of a second embodiment of the invention.

A second embodiment of the invention is illustrated in FIG. 5. Since the embodiment of the invention illustrated in FIG. 5 is similar to the embodiment of the invention illustrated in FIGS. 1 through 4, similar numerals will be utilized to designate similar components, the suffix letter $a$ being associated with the numerals in FIG. 5 to avoid confusion.

A coupling assembly $8a$ includes a lock ring $12a$, which is mounted on a plug $14a$ and cooperates with a stop ring $16a$ to hold the plug $14a$ in a socket $18a$. The annular stop ring $12a$ is disposed in an annular groove $13a$ formed in the plug $14a$ and has an annular surface $36a$ which moves into engagement with an annular stop surface $34a$ formed on the stop ring $16a$ to hold the plug in the socket chamber $20a$. When the plug $14a$ is to be withdrawn from the socket chamber $20a$, the plug $14a$ is pushed axially inwardly so that an annular cam ring $24a$ compresses the lock ring $12a$ radially inwardly from the expanded condition of FIG. 5 to a retracted condition in which a radially outer surface $60a$ of the lock ring $12a$ has a diameter which is less than the diameter of a cylindrical inner surface $52a$ of the annular stop ring $16a$.

The plug $14a$ is then pulled axially outwardly to disconnect the plug from the socket $18a$. As the plug $14a$ is moved axially outwardly, the cam ring $24a$ slides along a cylindrical inner wall $30a$ of the socket $18a$ with the lock ring $12a$. During this axially outward movement of the plug $14a$, the lock ring $12a$ moves into a telescopic relationship with the stop ring $16a$. Immediately thereafter, an annular end surface $64a$ on the surface ring $24a$ moves into abutting engagement with the annular stop surface $34a$. Continued outward movement of the plug $14a$ causes the lock ring $12a$ to move away from the cam ring $24a$ and through the opening in the stop ring $16a$. Once the lock ring $12a$ is moved axially outwardly of the stop ring $16a$ it resiliently expands to the extended condition shown in FIG. 5.

In the embodiment of the invention illustrated in FIGS. 1 through 4, an annular O-ring 88 sealingly engages the cylindrical inner surface of the socket wall 30 to prevent leakage of fluid from the connected coupling assembly 8. In the embodiment of the invention illustrated in FIG. 5, an O-ring seal $88a$ engages the socket wall $30a$ at a location inwardly of the cam ring $24a$ and lock ring $12a$ to prevent the leakage of fluid from the connected coupling $8a$.

Having disclosed specific preferred embodiments of the invention, the following is claimed:

1. A coupling assembly for connecting a plurality of conduits in fluid communication, said coupling assembly comprising a socket connected with one of the conduits, said socket including socket wall means for at least partially defining a socket chamber and stop surface means for defining a stop surface disposed in said socket chamber and for at least partially defining an opening of a predetermined size, a plug connected with the other of the conduits and adapted to be received in said socket chamber, a resilient lock ring disposed on said plug, said lock ring having a generally circular retaining surface adapted to engage said stop surface when said plug is disposed in a first position in said socket chamber to thereby hold said plug in said socket chamber, said lock ring being deflectable between a first condition in which said retaining surface on said lock ring has an outside dimension which is greater than the size of the opening formed by said stop surface and a second condition in which said retaining surface on said lock ring has an outside dimension which is less than the size of the opening formed by said stop surface to enable said lock ring to pass through the opening formed by said stop surface, and cam means disposed in said socket chamber inwardly of said stop surface for resiliently compressing said lock ring from said first condition to said second condition upon movement of said plug element axially inwardly from said first position to a second position and for retaining said lock ring in said second condition during axially outward movement of said plug as at least a portion of said lock ring passes through the opening formed by said stop surface.

2. A coupling assembly as set forth in claim 1 wherein said cam means includes a cam ring disposed in said socket chamber and movable axially by said plug and lock ring between a retracted position in which said cam ring is spaced apart from said surface means and an extended position in which said cam ring is disposed in abutting engagement with said stop surface means.

3. A coupling assembly as set forth in claim 2 wherein said cam ring includes internal cam surface means for compressing said lock ring from said first condition to said second condition upon movement of said plug from said first position to said second position.

4. A coupling assembly as set forth in claim 3 wherein said cam ring includes external surface means disposed in abutting engagement with said socket wall means, said external surface means on said cam ring being slidable along said socket wall means as said cam ring moves between said extended and retracted positions.

5. A coupling assembly as set forth in claim 4 wherein said stop surface means includes surface means disposed axially outwardly of said stop surface for engaging said plug to limit axially inward movement of said plug.

6. A coupling assembly comprising a socket adapted to be connected with a conduit and having a socket wall which at least partially defines a socket chamber, a movable cam ring disposed in said socket chamber in abutting engagement with said socket wall and having a circular inner opening, a stop ring disposed in said socket chamber and fixedly connected with said socket at a location axially outwardly of said cam ring, said stop ring having an annular inner surface which extends radially inwardly of said socket wall and at least partially defines a circular opening of a diameter which is greater than the diameter of the circular inner opening in said cam ring, a plug adapted to be connected with a conduit and having an outer end portion adapted to be received in said socket chamber, a resilient lock ring disposed on said outer end portion of said plug, said plug including surface means for retaining said lock ring on the outer end portion of said plug, and lock ring being deflectable from an expanded condition in which said lock ring has an external diameter which is greater than the diameter of the circular opening in said stop ring to a contracted condition in which said lock ring has an external diameter which is less than the diameter of the circular opening in said stop ring, said stop ring including first surface means for resiliently compressing said lock ring for said expanded condition to said retracted condition as said plug is inserted into said socket chamber to enable said lock ring to pass through said stop ring to a first position in which said lock ring is disposed axially inwardly of said stop ring, said lock ring being resiliently expandable from said contracted condition toward said expanded condition upon movement of said lock ring through said stop ring to said first position, said stop ring including surface means for engaging said lock ring when said lock ring is in said first position to retain the outer end portion of said plug in said socket chamber, said plug being movable axially inwardly from said first position to a second position in which at least a portion of said lock ring is disposed within the opening in said cam ring, said cam ring including guide surface means slidable along said socket wall for guiding movement of said plug from the second position to the first position with said portion of said lock ring disposed within the opening in said cam ring.

* * * * *